(12) United States Patent
Stahl

(10) Patent No.: US 10,766,360 B2
(45) Date of Patent: Sep. 8, 2020

(54) CLOSURE SYSTEM FOR A PRESSURIZED CONTAINER SYSTEM FOR A MOTOR VEHICLE

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 16/123,569

(22) Filed: Sep. 6, 2018

(65) Prior Publication Data

US 2019/0001813 A1    Jan. 3, 2019

Related U.S. Application Data

(63) Continuation of application No. PCT/EP2017/055470, filed on Mar. 8, 2017.

(30) Foreign Application Priority Data

Mar. 10, 2016  (DE) .......................... 10 2016 203 941

(51) Int. Cl.
*B60K 15/04* (2006.01)
*B60K 15/05* (2006.01)

(52) U.S. Cl.
CPC .......... *B60K 15/0406* (2013.01); *B60K 15/05* (2013.01); *B60K 2015/0432* (2013.01); *B60K 2015/0493* (2013.01)

(58) Field of Classification Search
CPC ................ B60K 15/0406; B60K 15/05; B60K 2015/0432; B60K 2015/0493
See application file for complete search history.

(56) References Cited

U.S. PATENT DOCUMENTS

| 5,954,387 A | 9/1999 | Fisher |
| 2009/0309386 A1 | 12/2009 | Yamamoto |
| 2014/0030015 A1* | 1/2014 | Beck ...................... B60K 15/04 403/349 |

FOREIGN PATENT DOCUMENTS

| DE | 11 2007 000 117 T5 | 11/2008 |
| DE | 10 2014 012 080 A1 | 3/2015 |
| JP | 61-111833 U | 7/1986 |
| JP | 4-46823 A | 2/1992 |
| JP | 2009-164597 A | 11/2008 |

(Continued)

OTHER PUBLICATIONS

PCT/EP2017/055470, International Search Report dated Aug. 3, 2017 (Three (3) pages).

(Continued)

*Primary Examiner* — Lori L Lyjak
(74) *Attorney, Agent, or Firm* — Crowell & Moring LLP

(57) ABSTRACT

A closure system for a pressurized container system for a motor vehicle includes a fuel filler flap and at least one refueling connection. The refueling connection has a non-return valve and a protective cap. The protective cap is designed to be pluggable onto an end of the refueling connection. The fuel filler flap covers a refueling compartment which is set back from the vehicle body. On the side facing the refueling compartment, the fuel filler flap has such a contour that the fuel filler flap can be closed only if the protective cap is fitted on the refueling connection.

8 Claims, 1 Drawing Sheet

(56) References Cited

FOREIGN PATENT DOCUMENTS

WO    WO-2016020239 A1 *  2/2016  ......... B60K 15/0406

OTHER PUBLICATIONS

German Search Report issued in German counterpart application No. 10 2016 203 941.5 dated Feb. 28, 2017, with Statement of Relevancy (Seven (7) pages).
"Automated Fuel Cap", Research Disclosure, Kenneth Mason Publications, Ltd., Hampshire, GB, No. 413, Sep. 1, 1998, Two (2) total pages, XP000824877.

* cited by examiner

CLOSURE SYSTEM FOR A PRESSURIZED CONTAINER SYSTEM FOR A MOTOR VEHICLE

CROSS REFERENCE TO RELATED APPLICATIONS

This application is a continuation of PCT International Application No. PCT/EP2017/055470, filed Mar. 8, 2017, which claims priority under 35 U.S.C. § 119 from German Patent Application No. 10 2016 203 941.5, filed Mar. 10, 2016, the entire disclosures of which are herein expressly incorporated by reference.

BACKGROUND AND SUMMARY OF THE INVENTION

The technology disclosed here relates to a closure system for a pressurized container system of a motor vehicle.

Motor vehicles with pressurized container systems are known as such. They comprise a refueling connection, also called a tank nozzle or tank receptacle, which lies behind a fuel filler flap. In order to protect the tank nozzle from dirt and/or condensation or formation of ice, the tank nozzle is protected by a protective cap. For refueling, a fueling nozzle is plugged onto the refueling connection, the fueling nozzle taking up a comparatively large amount of construction space. The fuel filler flap can therefore be closed even if the protective cap is not located on the refueling connection at all or is not correctly positioned. The refueling connection and the following hydrogen conducting components may become untight due to dust and other dirt or their function may be interfered with in some other way. Complete destruction of components is also possible.

It is a preferred object of the technology disclosed here to reduce or to eliminate the disadvantages of the previously known solutions. Further preferred objects emerge from the advantageous effects of the technology disclosed here.

The technology disclosed here relates to a closure system for a pressurized container system for storing fuel in a motor vehicle which is operated, for example, with compressed natural gas (CNG) or liquefied natural gas (LNG) or with hydrogen. The pressurized container can be, for example, a cryogenic pressurized container or a high pressure gas container. High pressure gas containers are designed so as, substantially at ambient temperatures, to store fuel (e.g., hydrogen) permanently at a maximum operating pressure (MOP) of above approx. 350 barg (=positive pressure in relation to the atmospheric pressure), furthermore preferably of above approx. 500 barg and particularly preferably of over approx. 700 barg. A cryogenic pressurized container is suitable in particular for storing the fuel at temperatures which lie significantly below the operating temperature (what is meant is the temperature range of the vehicle surroundings in which the vehicle is intended to be operated) of the motor vehicle, for example at least 50 kelvin, preferably at least 100 kelvin or at least 150 kelvin below the operating temperature of the motor vehicle (as a rule approx. 40° C. to approx. +85° C.).

The closure system comprises at least one fuel filler flap and at least one refueling connection or tank nozzle or tank receptacle (the term "refueling connection" is used for simplification below). The refueling connection has a non-return valve closing the refueling system, and a protective cap. The non-return valve is designed to avoid fuel from flowing back into the refueling system or fuel flowing out of the pressurized container system through the refueling connection. In particular, a refueling connection as indicated in the standard SAE J2600:2002 (where it is called a "receptacle") is involved. As a rule, one end of the refueling connection is designed to be connected to a fueling nozzle, whereas the other end is fluidically connected via a fuel conducting line system to the at least one pressurized container. That end of the refueling connection which is connectable to the fueling nozzle and the non-return valve can be accommodated in a constructional unit. Furthermore, the two elements can also be arranged adjacent to each other in different housings. The non-return valve therefore takes on the function of the fuel filler cover, which closes a filling opening, of a conventional fuel tank for diesel or petrol.

The protective cap is designed to be pluggable onto the refueling connection. The protective cap protects the refueling connection against possible impurities or other environmental influences. The protective cap is expediently designed to radially seal the refueling connection. For this purpose, the protective cap can have a base from which at least one side wall extends. This side wall can lie in a sealing manner against a circumferential wall of the refueling connection. By means of such a radial seal, large tolerances can be compensated for without substantial closing forces being necessary. In particular, the plugging on can be configured such that the protective cap can be slid on and cannot be screwed on at the same time.

The fuel filler flap is arranged as in the case of conventional motor vehicles. As a rule, it ends flush with the directly surrounding regions of the outer contour of the motor vehicle body, or contour thereof which is visible from the outside (also outer skin of the motor vehicle body below). In particular, the fuel filler flap covers the refueling connection and possible further interfaces, such as, for example, communication interfaces, which are used during the refueling.

The refueling connection and the other interfaces are arranged in a refueling compartment B which is set back from the outer skin of the vehicle body and is covered by the fuel filler flap.

The fuel filler flap, on the side facing the refueling compartment B, has such a contour that the fuel filler flap can be closed only if the protective cap is fitted on the refueling connection. That is, in the closed state of the fuel filler flap, the contour projects into the refueling compartment B to an extent such that, in the closed state of the fuel filler flap, no free space for the protective cap and/or for a loss-preventing means of the protective cap is available in the refueling compartment B, into which free space the protective cap and/or the loss-preventing means is/are disposable in a destruction-free manner, unless the protective cap is mounted onto the refueling connection. It can thereby be ensured in a simple, robust, cost effective and/or error proof manner that the protective cap is plugged on before the fuel filler flap is closed.

As an alternative to the aforementioned contour, the protective cap can also be mounted on that side of the fuel filler flap which faces the refueling compartment, wherein the protective cap is plugged onto the refueling connection by closing of the fuel filler flap. For this purpose, the protective cap can be adhesively bonded or injection molded onto the fuel filler flap. The protective cap is preferably of elastic design such that possible manufacturing tolerances can be compensated for and also a pivoting closing movement of the fuel filler flap is made possible. For this purpose, use can preferably be made of a rubber material.

The loss-preventing means can be designed and arranged in such a manner that the protective cap is not disposable in a destruction-free manner outside the refueling compartment B in such a manner that the fuel filler flap would be or is also closable without the protective cap being located in the refueling compartment B. The loss-preventing means can restrict the spatial positioning of the protective cap in such a manner that, in the closed state of the fuel filler flap, the protective cap is not disposable outside the refueling compartment B laterally next to the fuel filler flap, wherein laterally here comprises at the top, bottom, on the left and/or right next to the fuel filler flap. The loss-preventing means can have a thickness which is greater than a gap S between the fuel filler flap and those regions of the outer skin of the vehicle body that are directly adjacent to the fuel filler flap, and therefore the fuel filler flap cannot close if the loss-preventing means runs through the gap S.

In other words, for the present application, the inner side of the fuel filler cover is shaped in particular in such a manner that closing of the fuel filler cover is possible only upon correct positioning of the protective cap.

This is possible by means of a "key lock arrangement" of protective cap and inner side of the fuel filler cover.

According to the teaching disclosed here, the loss-preventing means is intended to be dimensioned in such a manner that closing of the fuel filler flap is not possible unless the protective cap is located on the tank nozzle. For this purpose, the thickness of the loss-preventing means can be greater than a gap on the fuel filler flap. Alternatively or in addition, the loss-preventing means can be configured by dimensioning and connection point in such a manner that the protective cap cannot be brought in a destruction-free manner outside the refueling compartment. In other words, the action radius of the protective cap is therefore restricted to the compartment which is closable by the fuel filler flap.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
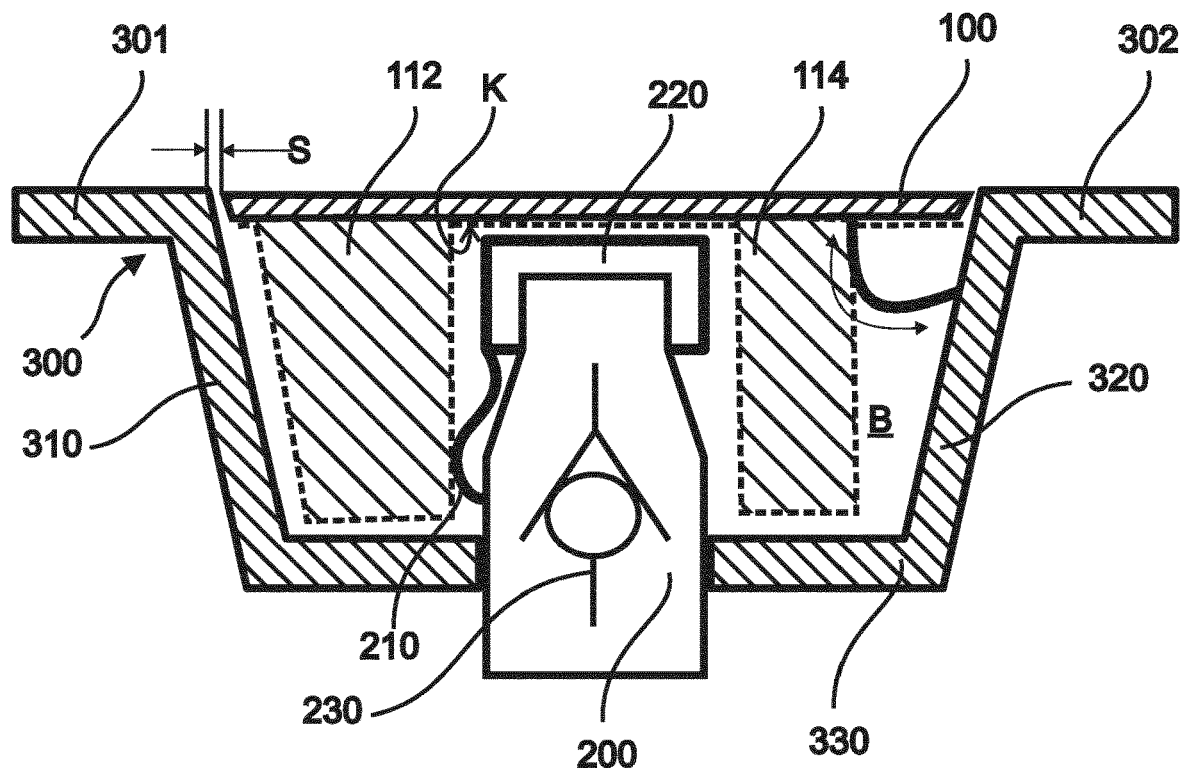
FIG. 1 shows a schematic cross sectional view of a first closure system.

FIG. 1 shows a schematic cross section of a refinement of the closure system disclosed here. The motor vehicle body 300 is illustrated here only in a small cutout around the fuel filler flap 100. In the closed state, the fuel filler flap 100 ends flush with the directly adjacent regions 301, 302 of the motor vehicle geometry 300 if the protective cap 220 is correctly fitted. The fuel filler flap 100 is fastened rotatably or pivotably to the body 300 via a joint (not shown specifically). The fuel filler flap 100 is formed here toward the outer side by a metal sheet or a plastics plate. The interior contour or inner contour K of the fuel filler flap 100 is illustrated by dashed lines here. It is formed by the inner side of the metal sheet or of the plastics plate and by further contour bodies 112, 114 which project into the refueling compartment B. The contour bodies 112, 114 can be produced from a very wide variety of materials. Dimensionally stable plastics elements which are fixedly connected to the fuel filler flap 100, for example are adhesively bonded or injection molded thereon, are advantageous.

The refueling compartment B here is the compartment which is formed by the metal sheet or the plastics plate of the fuel filler flap and the walls 310, 320, 330 of the body 300 that restrict the interface elements for the refueling. Only the refueling connection 200 is shown here as an interface element. Furthermore, further communication interfaces can also be provided. The refueling compartment B is arranged set back from those regions 301, 302 of the motor vehicle body 300 that are arranged outward toward the surroundings and are arranged directly adjacent to the fuel filler flap 100. As in the case of conventional motor vehicles, the refueling compartment B is accessible from the outside and can be seen into when the fuel filler flap is open. The dashed contour K and the outer surfaces of the walls 310, 320, 330 of the body 300 are designed and arranged in the closed state of the fuel filler flap 100 in such a manner that a gap only arises between the contour K and the outer surfaces, in which the protective cap 220 cannot be arranged. If the protective cap 220 is therefore not correctly fitted on the refueling connection 200, the fuel filler flap 100 cannot be correctly closed. This is recognized by the vehicle driver and the latter will correctly position the protective cap 220. The annular side wall of the protective cap 220 seals the refueling connection 200 in the radial direction by the annular side wall lying in a sealing manner against the circumferential wall of the refueling connection 200.

Furthermore, it can be provided that a protective cap 220 which is not completely pushed on is pushed on further onto the refueling connection 200 by means of the closure movement of the fuel filler flap 100.

Figure 2:
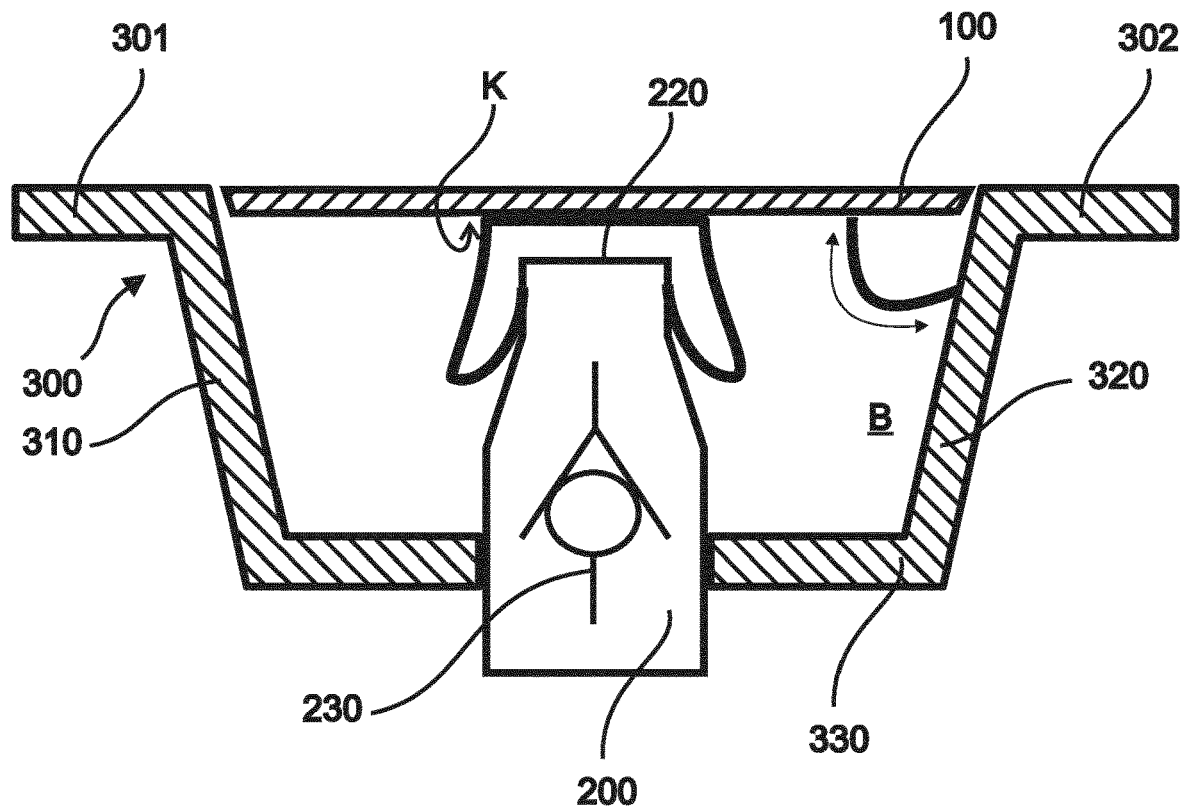
FIG. 2 shows a schematic cross sectional view of a second closure system.

FIG. 2 shows a schematic cross section of a further refinement of the closure system disclosed here. Only the differences over FIG. 1 will be explained below. In the embodiment illustrated here, the protective cap 220 is adhesively bonded directly onto the fuel filler flap 100. The protective cap 220 is manufactured from an elastic rubber material and is designed to taper in a slightly conical manner on its inner side toward the fuel filler flap 100. The protective cap 220 is provided and mounted in such a manner that, by closing of the fuel filler flap 100, the protective cap 220 is plugged onto the refueling connection 200. The contour bodies 112, 114 and the loss-preventing means 210 can advantageously be dispensed with here.

In FIG. 1 and FIG. 2 which are illustrated here, the non-return value 230 is in each case arranged in the same housing as the refueling connection. The non-return valve 230 which acts as a "fuel filler cover" can also be provided as a separate component downstream of and adjacent to the connection end.

The previous description of the present invention serves merely for illustrative purposes and not for the purpose of limiting the invention. Within the scope of the invention, various amendments and modifications are possible without departing from the scope of the invention and the equivalents thereof.

LIST OF REFERENCE CHARACTERS

Fuel filler flap 100
Contour bodies 112, 114
Refueling connection 200
Loss-preventing means 210
Protective cap 220
Non-return valve 230
Vehicle body 300
Adjacent regions of the outer skin 301, 302
Walls 310, 320, 330

Refueling compartment B
Gap S

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closure system for a pressurized container system for a motor vehicle, comprising:
    a fuel filler flap; and
    a refueling connection, wherein the refueling connection has a non-return valve and a protective cap and wherein the protective cap is pluggable onto the refueling connection;
    wherein the fuel filler flap covers a refueling compartment which is set back from an outer skin of a vehicle body of the motor vehicle;
    wherein the fuel filler flap, on a side facing the refueling compartment, has a contour such that the fuel filler flap can be closed only if the protective cap is plugged onto the refueling connection;
    wherein, in a closed state of the fuel filler flap, the contour projects into the refueling compartment to an extent such that, in the closed state of the fuel filler flap, no free space for the protective cap and/or for a loss-preventing device of the protective cap is available in the refueling compartment, into which free space the protective cap and/or the loss-preventing device is/are disposable in a destruction-free manner, unless the protective ca is mounted onto the refueling connection.

2. The closure system as claimed in claim 1, wherein the loss-preventing device is configured such that the protective cap is not disposable in a destruction free manner outside the refueling compartment in such a manner that the fuel filler flap is also closeable, without the protective cap being disposed in the refueling compartment.

3. The closure system as claimed in claim 1, wherein the loss-preventing device restricts a spatial positioning of the protective cap in such a manner that, in the closed state of the fuel filler flap, the protective cap is not disposable outside the refueling compartment next to the fuel filler flap.

4. The closure system as claimed in claim 1, wherein the loss-preventing device has a thickness which is greater than a gap between the fuel filler flap and regions of the vehicle body that are directly adjacent to the fuel filler flap such that the fuel filler flap cannot close if the loss preventing device runs through the gap.

5. The closure system as claimed in claim 1, wherein the contour and the protective cap are configured such that the contour cannot grip behind the protective cap.

6. The closure system as claimed in claim 1, wherein the refueling connection is radially sealable by the protective cap.

7. A pressurized container system for storing fuel, comprising the closure system as claimed in claim 1.

8. A motor vehicle, comprising the closure system as claimed in claim 1 and a pressurized container system, wherein natural gas or hydrogen is storable in the pressurized container system.

* * * * *